United States Patent
Zhang

(10) Patent No.: US 8,229,379 B2
(45) Date of Patent: Jul. 24, 2012

(54) FREQUENCY PLANNING FOR SWITCHING DEVICES FOR MULTI-BAND BROADCAST RADIOS

(75) Inventor: Ligang Zhang, Guangdong (CN)

(73) Assignee: Silicon Laboratories Inc., Austin, TX (US)

( * ) Notice: Subject to any disclaimer, the term of this patent is extended or adjusted under 35 U.S.C. 154(b) by 731 days.

(21) Appl. No.: 12/286,314

(22) Filed: Sep. 30, 2008

(65) Prior Publication Data
US 2009/0253391 A1 Oct. 8, 2009

Related U.S. Application Data

(66) Substitute for application No. 61/123,094, filed on Apr. 4, 2008.

(51) Int. Cl.
*H04B 1/18* (2006.01)

(52) U.S. Cl. ............ 455/168.1; 455/130; 455/169.1; 455/150.1; 307/82; 307/43; 307/150; 327/530; 327/538; 327/542

(58) Field of Classification Search ............ 455/130, 455/168.1, 169.1, 150.1, 143, 154.1, 298, 455/299, 343.2, 343.3, 343.4, 345.5, 343.6; 307/82, 43, 150, 85, 86; 327/530, 538, 542, 327/543
See application file for complete search history.

(56) References Cited

U.S. PATENT DOCUMENTS

| | | | |
|---|---|---|---|
| 5,177,372 A * | 1/1993 | Yajima et al. | 307/85 |
| 6,223,025 B1 | 4/2001 | Tsukuda | 455/343 |
| 6,727,679 B2 | 4/2004 | Kovarik et al. | 323/222 |
| 6,791,375 B2 | 9/2004 | Yang et al. | 327/99 |
| 6,844,710 B2 | 1/2005 | Lipcsei et al. | 323/284 |
| 7,098,642 B2 | 8/2006 | Lipcsei et al. | 323/284 |
| 7,116,566 B2 | 10/2006 | Yang et al. | 363/41 |
| 7,142,441 B2 * | 11/2006 | Mitrosky et al. | 363/39 |
| 7,202,609 B2 | 4/2007 | Langeslag et al. | 315/291 |
| 7,652,461 B2 | 1/2010 | Tateishi | 323/284 |
| 2004/0119638 A1 * | 6/2004 | Fagan et al. | 342/357.03 |

* cited by examiner

*Primary Examiner* — Tuan Pham
(74) *Attorney, Agent, or Firm* — O'Keefe, Egan, Peterman & Enders, LLP

(57) ABSTRACT

Systems and methods are disclosed that use multiple DC-DC (direct-current-to-direct-current) regulators and configurable DC-DC regulators with respect to multi-band audio receivers in order to allow for the use of different DC-DC regulator switching clock signals for different audio broadcast bands. The systems and methods disclosed thereby help to alleviate interference problems typically caused by switching devices used in the DC-DC conversion process. The embodiments described are also applicable to switching power supplies run from alternating current (AC) power sources and to Class D amplifiers working with broadcast radios.

11 Claims, 4 Drawing Sheets

FREQUENCY PLANNING FOR SWITCHING DEVICES FOR MULTI-BAND BROADCAST RADIOS

RELATED APPLICATIONS

This application claims priority to the following co-pending provisional application: Provisional Application Ser. No. 61/123,094, filed on Apr. 4, 2008, and entitled "FREQUENCY PLANNING FOR SWITCHING DEVICES FOR BROADCAST RADIOS," which is hereby incorporated by reference in its entirety.

TECHNICAL FIELD OF THE INVENTION

This invention relates to broadcast receivers and, more particularly, to reception of channels within radio broadcast bands.

BACKGROUND

Broadcast radio receivers are becoming more and more portable. It is desirable, therefore, to run these portable devices on batteries. Some batteries, such as Lithium ion batteries require more extensive and costly BOMs (build of materials) than other batteries, such as alkaline batteries. For small portable radios, for example, AA and/or AAA sized alkaline batteries are often a relatively inexpensive battery solution option. In addition, rechargeable AA and AAA batteries can typically be used in devices designed for use with AA and/or AAA sized alkaline batteries.

One problem with the use of AA and/or AAA batteries (e.g., alkaline or rechargeable), however, is that these batteries often provide a limited voltage output. For example, typical alkaline or lithium AA/AAA batteries often provide a nominal output voltage of about 1.5 volts, and typical rechargeable AA/AAA batteries (NiCd, NiMH) often provide a nominal output voltage of about 1.2 volts. This limited voltage can sometimes be problematic if it is desired to power circuitry needed higher voltage levels.

To increase the voltage output, AA and/or AAA batteries can be run in series to increase the voltage output provided by these batteries. However, adding batteries causes an undesirable increase in size. Alternatively, direct-current-to-direct-current (DC-DC) voltage converters can be used to increase voltage levels. However, the problem with such a step-up DC-DC option for broadcast radio devices is that strong interference from DC-DC induced noise sources is typically caused on AM, FM, SW (short wave), and LW (long wave) audio broadcast channels at the radio device.

One prior effort to reduce the interference from these switching noise sources has been to shield the audio receiver circuitry from the switching circuitry noise sources or to increase the distance from the switching circuitry noise sources to the receiver circuitry. These solutions are somewhat effective; however, these solutions also can have the undesirable result of increasing the size and cost of the device. Another solution has been to apply spread spectrum to the DC-DC switching to spread out the impact of the switching across a wider frequency range. However, this spread spectrum solution adds further complexity and cost to the device. A more efficient and cost effective solution, therefore, is desirable.

SUMMARY OF THE INVENTION

Systems and methods are disclosed that use multiple DC-DC (direct-current-to-direct-current) regulators and configurable DC-DC regulators with respect to multi-band audio receivers in order to allow for the use of different DC-DC regulator switching clock signals for different audio broadcast bands. The systems and methods disclosed thereby help to alleviate interference problems typically caused by switching devices used in the DC-DC conversion process. The embodiments described herein are also applicable to switching power supplies run from alternating current (AC) power sources and to Class D amplifiers working with broadcast radios. As described below, other features and variations can be implemented, if desired, and a related systems and methods can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

Figure 1:
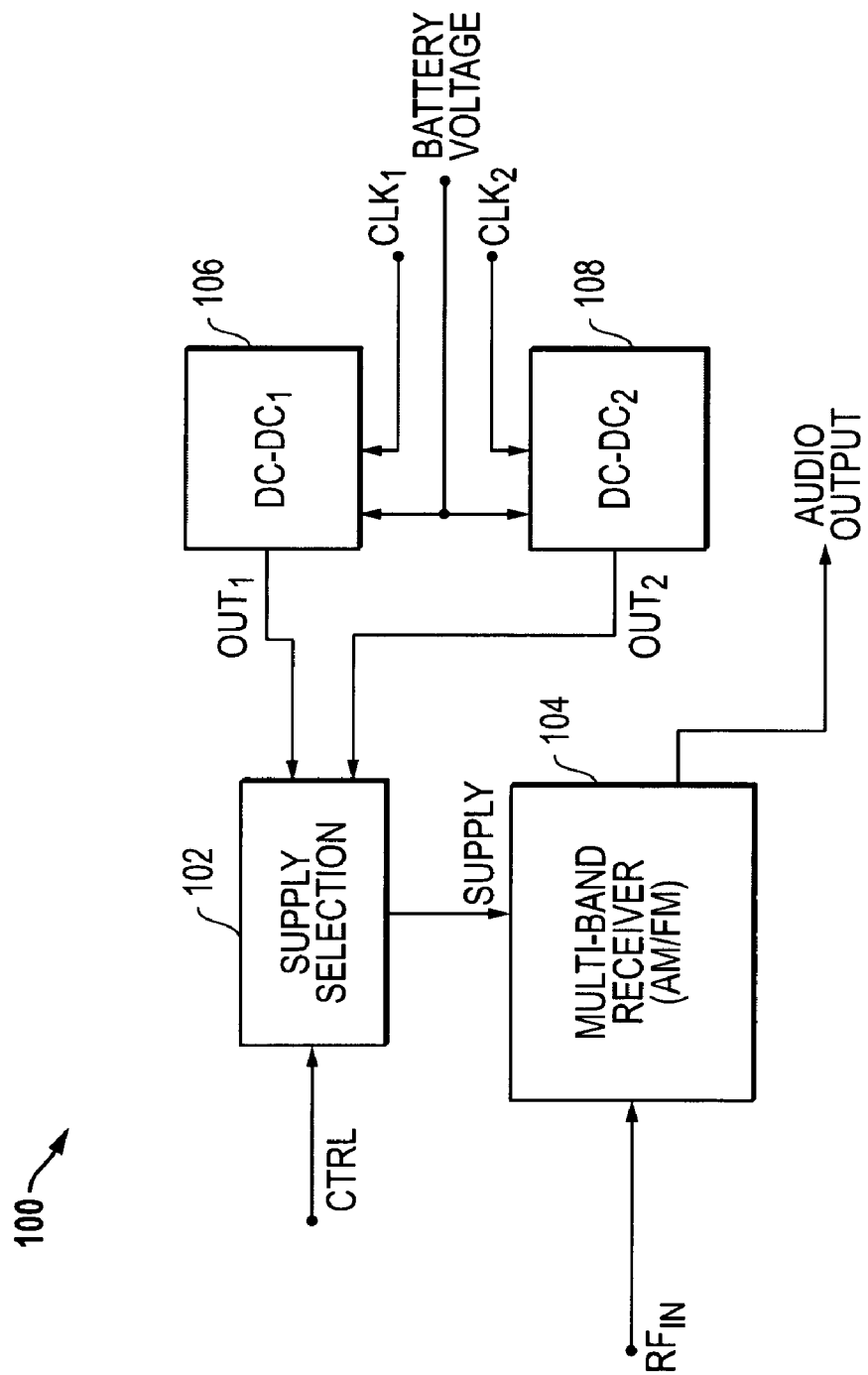
FIG. 1 is a block diagram for a broadcast receiver embodiment having multiple selectable DC-DC (direct-current-to-direct-current) regulators.

Methods and systems are disclosed for addressing the interference typically caused by switching devices used in the DC-DC conversion process. The embodiments described herein are also applicable to switching power supplies run from alternating current (AC) power sources and to Class D amplifiers working with broadcast radios.

For the most part, DC-DC interference comes form the switching activities that occur at the predetermined operating frequencies of the DC-DC regulators.

With a DC-DC operating frequency at around 2 MHz, the interference effect on the AM band (520 KHz-1710 KHz) and LW band (153 KHz-279 KHz) is small and can be mostly or completely eliminated with a small additional build of materials (BOM), for example, through the use of appropriate filter circuitry. However, the 2 MHz switching frequency has a large interference effect on the SW band (2.3 MHz to 30 MHz) and the FM band (64 MHz to 108 MHz). And this interference effect is very difficult to reduce and/or eliminate without a lot of effort and increased BOM.

With a DC-DC operating frequency at around 100 KHz, the interference effect on the SW band and the FM band is very manageable but the interference effect on the AM band and the LW band is very large and difficult to handle.

The systems and methods described herein use multiple DC-DC regulators with different switching clock rates and/or DC-DC regulators with configurable switching clock rates for multi-band audio receivers in order to allow for the use of different DC-DC regulators and/or switching clock rates for different audio broadcast bands. With respect to multiple DC-DC regulators, while the selected DC-DC regulator operates, the non-selected DC-DC regulator does not operate so that switching interference from the non-selected DC-DC regulator is not produced. As described herein, therefore, for a multi-band receiver, the switching rate used for the DC-DC regulator is selected so as to reduce switching interference in the selected frequency band of operation for the multi-band receiver.

As disclosed in one embodiment, two (or possibly more, if desired) DC-DC regulators are used. One DC-DC regulator runs at a first switching rate (e.g., 2 MHz) and the other runs at a second switching rate (e.g., 100 KHz) with each rate being selected to provide reduced interference in one of the operating bands for the audio receiver. The selection of which DC-DC regulator to use is made depending upon the broadcast band to which the radio receiver chip is tuning. For example, a first DC-DC regulator running at 2 MHz can be used for AM band and LW band reception, and a second DC-DC regulator running at 100 KHz can be used for FM band and SW band reception. An example embodiment for this solution is shown with respect to FIG. 1 and is described in more detail below.

Existing DC-DC solutions on the market today do not have the ability to operate efficiently in two completely different frequency bands.

The implementation techniques for making smooth transitions and reducing discomfort to users listening to the device can be solution specific. In one embodiment, an adjustable output voltage DC-DC regulator can be integrated with a MCU (microcontroller unit) and the other voltage DC-DC regulator can be standalone circuitry having a fixed output voltage. One implementation for a smooth transition involves setting the fixed output DC-DC to a medium voltage and the variable output DC-DC to either a slightly lower voltage or a slightly higher voltage than that medium voltage depending on whether or not it is desired to use the variable output DC-DC, respectively. At any given time, only one DC-DC is actively working, although the MCU can be operated all the time, so that the switching from the non-used DC-DC does not cause disturbance during band switching within normal operations.

In a further embodiment, two DC-DC regulators are integrated within a single integrated circuit with or without a MCU also integrated together with the DC-DC regulators. This implementation allows core circuitry within the integrated circuit to be shared between the DC-DC regulators with little added complexity beyond one DC-DC regulator. An embodiment for this solution is show with respect to FIG. 2 and is described in more detail below.

Another variation is to provide a DC-DC regulator that has a switching frequency that is adjustable in a small range rather than having two DC-DC regulators at two different disparate switching frequencies (e.g., either 100 KHz or 2 MHz). For example, the frequency adjustable DC-DC could have a switching frequency that has a nominal value of 2 MHz that can be adjusted up 50 KHz or down 50 KHz in incremental steps (e.g., 10 KHz steps) so that the switching frequency can be changed on the fly according to a specific station being tuned. Even two closely spaced available switching frequencies, such as 2 MHz and 1.950 MHz, would provide flexibility in avoiding interference trouble spots. Similarly, the frequency adjustable DC-DC could have a switching frequency that has a nominal value of 2 MHz that can be adjusted up 200 KHz or down 200 KHz in incremental steps (e.g., 50 KHz steps) so that the switching frequency can be changed on the fly according to a specific station being tuned. Again, even two closely spaced available switching frequencies, such as 2 MHz and 1.80 MHz, would provide flexibility in avoiding interference trouble spots. Frequency planning can then be used to select which of the adjustable switching frequency values will be used for which audio bands and for which channels within the audio bands. An embodiment for this solution is shown with respect to FIG. 3 and is described in more detail below.

It is also noted that the switching frequencies do not have to be precise for the described embodiments to work well, as long as the interference caused by the switching can be configured to fall outside of the frequency of interest at any given time.

FIG. 1 provides a circuit block diagram for an example embodiment 100. Multi-band audio broadcast receiver circuitry 104 receives a radio frequency input ($RF_{IN}$) including multiple channels within two or more broadcast bands. As depicted, receiver circuitry 104 is configured to receive AM band and FM band (AM/FM) audio broadcasts, although receiver circuitry 104 could be configured to receive different and/or additional bands, as desired. Within each of these bands, there are multiple broadcast channels upon which one or more stations may be broadcasting audio content. AM/FM receiver circuitry 104 then outputs one or more audio signals (AUDIO OUTPUT), for example, left and right stereo output signals that can drive an external speaker.

As depicted, two DC-DC regulators are provided to generate supply voltages for the AM/FM receiver 104. A first DC-DC regulator ($DC-DC_1$) 106 provides a first supply voltage ($OUT_1$) to the supply selection circuitry 102. $DC-DC_1$ 106 uses a first switching clock signal ($CLK_1$) to produce a higher voltage from the battery voltage. A second DC-DC regulator ($DC-DC_2$) 108 provides a second supply voltage ($OUT_2$) to the supply selection circuitry 102. $DC-DC_1$ 108 uses a second switching clock signal ($CLK_2$) to produce a higher voltage from the battery voltage. A control signal (CTRL) is used to control the supply selection circuitry 102 to determine which of the voltage supply sources are provided to the AM/FM receiver 104 as the supply. The AM/FM receiver 104 receives a supply voltage from supply selection circuitry 102.

Figure 2:
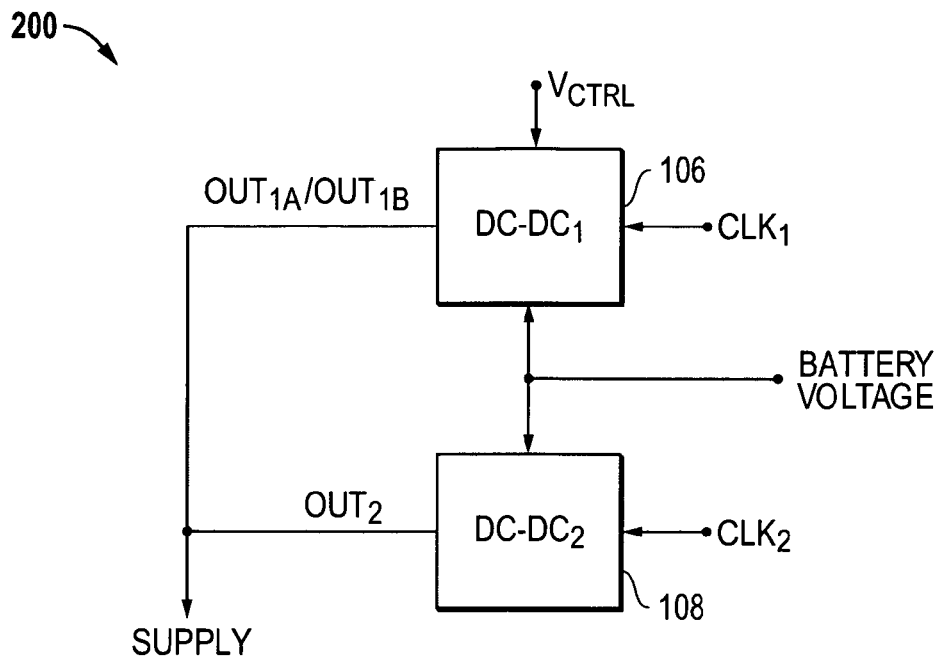
FIG. 2 is a block diagram for an embodiment where a supply voltage is directly provided from a plurality of DC-DC regulators.

FIG. 2 is a block diagram for an alternative embodiment 200 where the supply voltage is directly provided from either $DC-DC_1$ 106 or $DC-DC_2$ 108. Still further, $DC-DC_1$ 106 can be configured to provide two possible output supply voltages ($OUT_{1A}$, $OUT_{1B}$) based upon a voltage control signal ($V_{CTRL}$).

In operation, for example, the embodiment 200 of FIG. 2, $DC-DC_1$ 106 is configured to provide an adjustable output voltage of 2.7 volts for a first voltage output ($OUT_{1A}$) or an output voltage of 3.3 volts for a first voltage output ($OUT_{1B}$). The determination of which of these output voltages is provided is made through the voltage control signal ($V_{CTRL}$) applied to $DC-DC_1$ 106. $DC-DC_2$ 108 can be configured to provide an output voltage ($OUT_2$) at 3.0 volts. Also, $DC-DC_1$ 106 can use a first switching clock signal ($CLK_1$) set at 2 MHz. As described above, this switching clock frequency will have a significant impact on FM channels but will have little impact on AM channels. And $DC-DC_2$ 106 can use a second switching clock signal ($CLK_2$) set at 100 KHz. As described above, this switching clock frequency will have a significant impact on AM channels but will have little impact on FM channels.

When in FM mode, DC-DC$_1$ 106 can be set to output a voltage of 2.7 volts, and DC-DC$_2$ 108 can be set to output a voltage of 3.0 volts. As such, DC-DC$_1$ 106 will automatically be off. Thus, the supply voltage from DC-DC$_2$ 108 is provided as the supply voltage to the AM/FM receiver 104. When in AM mode, DC-DC$_1$ 106 can be set to output a voltage of 3.3 volts, and DC-DC$_2$ 108 can be set to output a voltage of 3.0 volts. As such, DC-DC$_2$ 108 can be configured to be automatically be off in this condition or to have its switching activity be reduced or minimized. Thus, the supply voltage from DC-DC$_1$ 106 is provided as the supply voltage to the AM/FM receiver 104. For example, the DC-DC$_2$ 108 can be configured to monitor its output. When the DC-DC$_2$ 108 sees that the output node already higher than the set voltage it is trying to boost to, an internal feedback loop can signal the DC-DC$_2$ 108 to stop working. Alternatively, DC-DC$_2$ 108 can be configured so that it does not turn itself off completely but reduces or minimizes its switching activity when it sees that the output node is already higher than the set voltage it is trying to boost to. This reduced switching operation will limit current loading thereby making the switching interference small as well.

Figure 3:
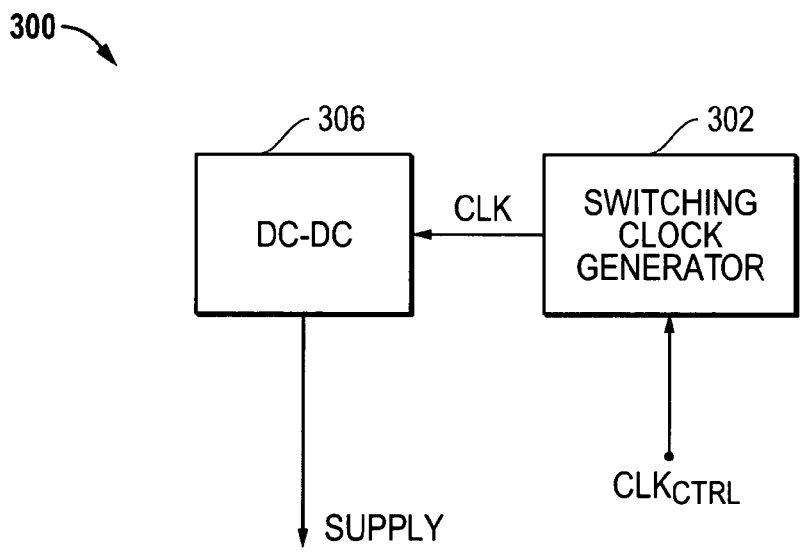
FIG. 3 is a block diagram for embodiment where a programmable switching clock frequency is provided to a DC-DC regulator to generate a supply voltage.

FIG. 3 is a circuit block diagram for an alternative embodiment 300, mentioned above, where a programmable switching clock frequency is provided to a single DC-DC regulator to generate the supply voltage. As depicted, the switching clock generator 302 receives a clock control signal (CLK$_{CTRL}$) that determines the frequency of the switching clock signal (CLK) provided to DC-DC 306. DC-DC 306 then provides the supply voltage to the AM/FM receiver 104. As indicated above, the clock control signal (CLK$_{CTRL}$) can be adjusted based upon the frequency band of operation and/or based upon the channel being tuned within a given frequency band of operation. For example, once a channel within a frequency band has been selected for tuning, the programmable switching clock frequency can be adjusted to reduce switching interference for the channel being tuned.

Figure 4:
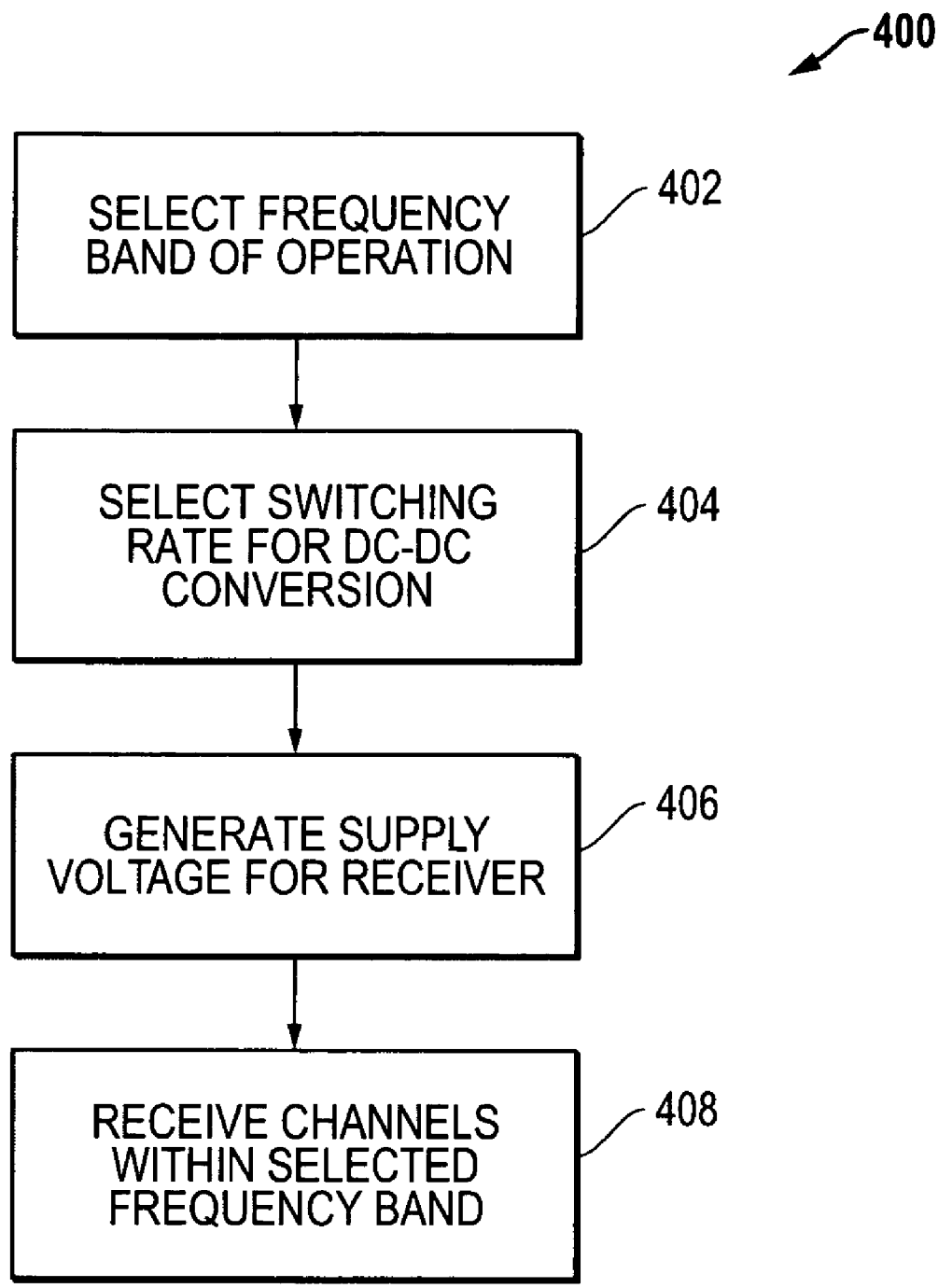
FIG. 4 is a process flow diagram for operating with a different switching clock frequency for a DC-DC regulator depending upon a selected frequency band of operation.

FIG. 4 is a process flow diagram for operating with a different switching clock frequency for a DC-DC regulator depending upon a selected frequency band of operation. As depicted, process embodiment 400 begins in block 402 where a frequency band of operation is selected for a multi-band receiver. In block 404, the switching rate for the DC-DC regulator for DC-DC conversion is selected. As described herein, this selection of the switching clock rate is made in order to reduce interference in the selected frequency band of operation. In block 406, a supply voltage is generated for the receiver circuitry using the DC-DC regulator operating using the selected switching clock rate. Finally, in block 408, channels are received and tuned by the receiver circuitry within the selected frequency band.

Figure 5A:
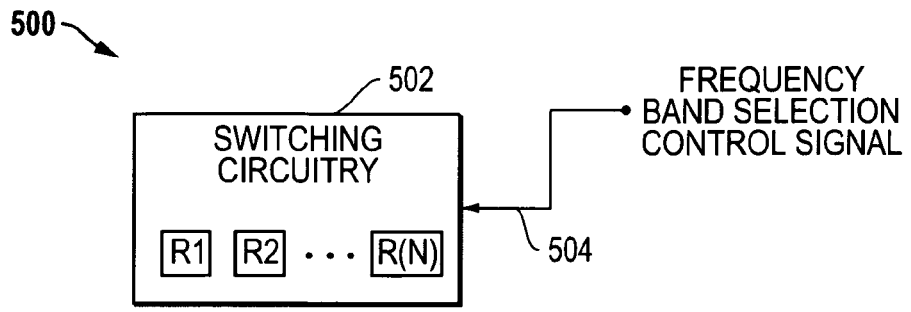
FIG. 5A is a block diagram for switching circuitry for multi-band audio applications including a switching clock rate dependent upon a frequency band of operation.
Figure 5B:
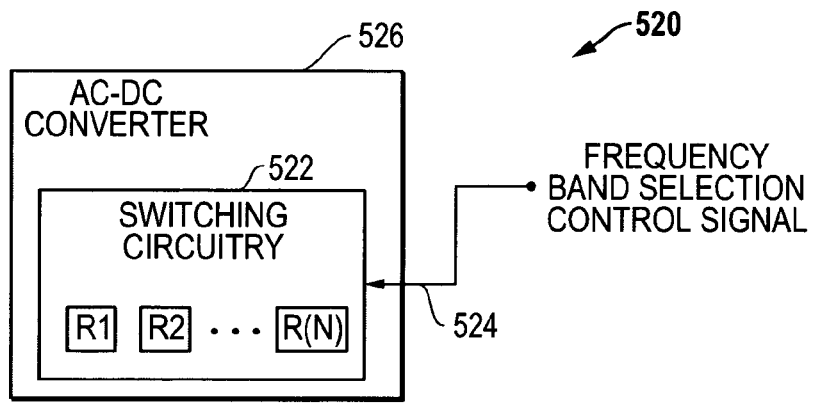
FIG. 5B is a block diagram for an AC-DC (alternating-current-to-direct-current) converter for multi-band audio applications having switching circuitry including a switching clock rate dependent upon a frequency band of operation.
Figure 5C:
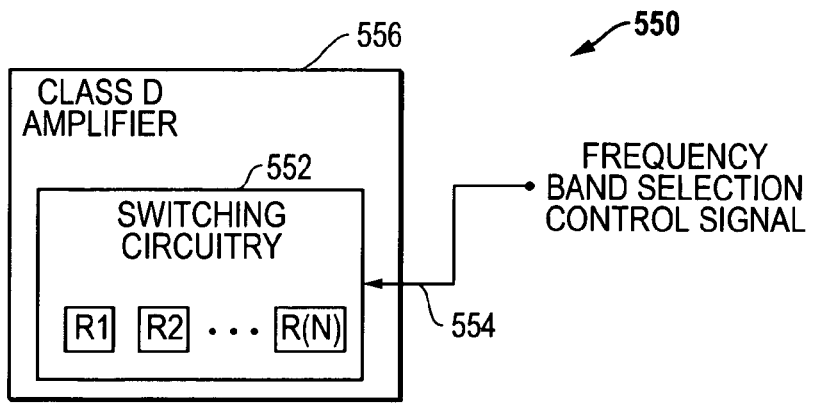
FIG. 5C is a block diagram for a class-D amplifier for multi-band audio applications having switching circuitry including a switching clock rate dependent upon a frequency band of operation.

As described above, switching clock rate control based upon a frequency band of operation for a multi-band audio application can be used for circuitry other than DC-DC regulators. Examples for such embodiments are now discussed with respect to FIGS. 5A-5C FIG. 5A is a block diagram for switching circuitry for multi-band audio applications including a switching clock rate dependent upon a frequency band of operation. As depicted, embodiment 500 includes switching circuitry 502. Switching circuitry 502 is configured to operate using a plurality of different switching clock rates R1, R2 . . . R(N). In operation, switching circuitry 502 receives a frequency band selection control signal 504 that determines which of the switching clock rates are used. As such, a switching clock rate can be selected that reduces or minimizes interference with the frequency band of operation.

As noted above, the systems and methods described herein can also be used with connections to AC power sources and, more particularly, to switching rates used by AC-to-DC power converters. The switching rates used to convert AC power to DC power in an AC-DC power converter can be selected and/or adjusted based upon the audio band and/or channels being received by a multi-band broadcast radio. As such, different switching rates, in addition to or different from the inherent 50 Hz or 60 Hz of the AC power supply, can be used to reduce interference in the broadcast band and/or channels being received.

FIG. 5B is a block diagram for an AC-DC (alternating-current-to-direct-current) converter for multi-band audio applications having switching circuitry including a switching clock rate dependent upon a frequency band of operation. As depicted, embodiment 520 includes switching circuitry 522. Switching circuitry 522 is configured to operate using a plurality of different switching clock rates R1, R2 . . . R(N). In operation, switching circuitry 522 receives a frequency band selection control signal 524 that determines which of the switching clock rates are used. As such, a switching clock rate can be selected that reduces or minimizes interference with the frequency band of operation.

As also noted above, the systems and methods described herein can be used with the output switching circuitry within Class D amplifiers used to output amplified audio signals. The switching rates used in the output stages of the Class D amplifier can be selected and/or adjusted based upon the audio band and/or channels being received by a multi-band broadcast radio in order to reduce interference in the broadcast band and/or channels being received.

FIG. 5C is a block diagram for a class-D amplifier for multi-band audio applications having switching circuitry including a switching clock rate dependent upon a frequency band of operation. As depicted, embodiment 550 includes switching circuitry 552, for example that can be used with output driver circuitry for the class-D amplifier. Switching circuitry 552 is configured to operate using a plurality of different switching clock rates R1, R2 . . . R(N). In operation, switching circuitry 552 receives a frequency band selection control signal 554 that determines which of the switching clock rates are used. As such, a switching clock rate can be selected that reduces or minimizes interference with the frequency band of operation.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A multi-band receiver, comprising:
   receiver circuitry configured to operate in a plurality of selectable frequency bands and coupled to receive a supply voltage, the selectable frequency bands comprising at least a first frequency band and a second frequency band each including multiple channels;
   a DC-DC (direct-current-to-direct-current) regulator system, comprising:
      first DC-DC regulator circuitry having a first switching clock input signal at a first switching clock rate and configured to provide a first voltage supply output signal for the supply voltage; and
      second DC-DC regulator circuitry having a second switching clock input signal at a second switching clock rate different from the first switching clock rate and configured to provide a second voltage supply output signal for the supply voltage, the second voltage supply output signal having a voltage level different from a voltage level for the first voltage supply output signal;
   wherein the first DC-DC regulator circuitry is used when the receiver circuitry is operating in the first frequency band and the second DC-DC regulator circuitry is used when the receiver circuitry is operating in the second frequency band;
   wherein the first voltage supply output signal from the first DC-DC regulator circuitry and the second voltage supply output signal from the second DC-DC regulator circuitry are coupled to a common node to provide the supply voltage to the receiver circuitry; and
   wherein the first DC-DC regulator circuitry is configured to output a first supply voltage level when the receiver circuitry is operating in the first frequency band and to output a second supply voltage level when the receiver circuitry is operating in the second frequency band, such that the first supply voltage level is lower than an output voltage level provided by the second DC-DC regulator circuitry and the second supply voltage level is higher than the output voltage level provided by the second DC-DC-regulator circuitry.

2. The multi-band receiver of claim 1, wherein the output voltage level for the second DC-DC regulator circuitry is a fixed voltage level.

3. The multi-band receiver of claim 2, wherein the second DC-DC regulator circuitry is configured to determine whether the first supply voltage level or the second supply voltage level is being output by the first DC-DC regulator circuitry and to adjust its operation depending upon this determination.

4. The multi-band receiver of claim 3, wherein the first DC-DC regulator circuitry is integrated within an integrated circuit with a microcontroller.

5. A method for reducing switching interference in a multi-band receiver, comprising:
   providing receiver circuitry configured to operate in a plurality of selectable frequency bands, the selectable frequency bands comprising at least a first frequency band and a second frequency band each including multiple channels;
   selecting a frequency band of operation for the receiver circuitry;
   operating first DC-DC regulator circuitry at a first switching clock rate to provide a first voltage supply output signal for the supply voltage when the first frequency band is selected;
   operating a second DC-DC regulator circuitry at a second switching clock rate to provide a second voltage supply output signal for the supply voltage when the second frequency band is selected, the second voltage supply output signal having a voltage level different from a voltage level for the first voltage supply output signal;
   further operating the first DC-DC regulator circuitry to output a first supply voltage level when the receiver circuitry is operating in the first frequency band and to output a second supply voltage level when the receiver circuitry is operating in the second frequency band, such that the first supply voltage level is lower than an output voltage level provided by the second DC-DC regulator circuitry and the second supply voltage level is higher than the output voltage level provided by the second DC-DC-regulator circuitry and
   coupling the output signals from the first DC-DC regulator circuitry and the second DC-DC regulator circuitry to a common node to provide the supply voltage to the receiver circuitry.

6. The method of claim 5, wherein the output voltage level for the second DC-DC regulator circuitry is a fixed voltage level.

7. The method of claim 6, further comprising operating the second DC-DC regulator circuitry to determine whether the first supply voltage level or the second supply voltage level is being output by the first DC-DC regulator circuitry and adjusting the operation of the DC-DC regulator circuitry based upon this determination.

8. A DC-DC (direct-current-to-direct-current) regulator system for multi-band receivers, comprising
   first DC-DC regulator circuitry having a first switching clock input signal at a first switching clock rate and configured to provide a first voltage supply output signal for the supply voltage; and
   second DC-DC regulator circuitry having a second switching clock input signal at a second switching clock rate different from the first switching clock rate and configured to provide a second voltage supply output signal for the supply voltage, the second voltage supply output signal having a voltage level different from a voltage level for the first voltage supply output signal;
   wherein the first DC-DC regulator circuitry is configured to be used in a first frequency band and the second DC-DC regulator circuitry is configured to be used in a second frequency band, each frequency band including multiple channels;
   wherein the first voltage supply output signal from the first DC-DC regulator circuitry and the second voltage supply output signal from the second DC-DC regulator circuitry are coupled to a common node to provide the supply voltage to the receiver circuitry; and
   wherein the first DC-DC regulator circuitry is configured to output a first supply voltage level when the receiver circuitry is operating in the first frequency band and to output a second supply voltage level when the receiver circuitry is operating in the second frequency band, such that the first supply voltage level is lower than an output voltage level provided by the second DC-DC regulator circuitry and the second supply voltage level is higher than the output voltage level provided by the second DC-DC-regulator circuitry.

9. The DC-DC regulator system of claim 8, wherein the output voltage level for the second DC-DC regulator circuitry is a fixed voltage level.

10. The DC-DC regulator system of claim 9, wherein the second DC-DC regulator circuitry is configured to determine whether the first supply voltage level or the second supply voltage level is being output by the first DC-DC regulator circuitry and to adjust its operation depending upon this determination.

11. The DC-DC regulator system of claim 10, wherein the first DC-DC regulator circuitry is integrated within an integrated circuit with a microcontroller.

* * * * *